United States Patent
Tu et al.

(10) Patent No.: US 8,928,952 B2
(45) Date of Patent: Jan. 6, 2015

(54) SCANNING APPARATUS

(71) Applicant: Primax Electronics Ltd., Neihu, Taipei (TW)

(72) Inventors: Tung-Wen Tu, Taipei (TW); Jiang-Wei Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 14/019,115

(22) Filed: Sep. 5, 2013

(65) Prior Publication Data

US 2014/0327941 A1    Nov. 6, 2014

(30) Foreign Application Priority Data

May 6, 2013 (CN) .................... 2013 2 0239114 U (51) Int. Cl.
| | | |
|---|---|---|
| *H04N 1/04* | (2006.01) | |
| *H04N 1/024* | (2006.01) | |
| *H04N 1/12* | (2006.01) | |

(52) U.S. Cl.
CPC ........... *H04N 1/02445* (2013.01); *H04N 1/126* (2013.01)
USPC ............ 358/461; 358/496; 358/498; 358/408

(58) Field of Classification Search
CPC ............... H04N 1/401; H04N 1/4076; H04N 2201/0424; H04N 1/193; H04N 2201/00042
USPC .......... 358/461, 496, 498, 408; 399/364, 367, 399/374; 355/23, 24; 382/274
See application file for complete search history.

(56) References Cited

U.S. PATENT DOCUMENTS

| | | | | |
|---|---|---|---|---|
| 7,525,692 | B2 * | 4/2009 | Nakaya ......................... | 358/461 |
| 7,692,818 | B2 * | 4/2010 | Futami ......................... | 358/3.26 |
| 8,659,808 | B2 * | 2/2014 | Huang et al. .................. | 358/505 |
| 2002/0093692 | A1 * | 7/2002 | Spencer ....................... | 358/449 |

* cited by examiner

*Primary Examiner* — Cheukfan Lee
(74) *Attorney, Agent, or Firm* — Kirton McConkie; Evan R. Witt (57) ABSTRACT

A scanning apparatus includes a scanning module, a calibration plate, and a driving module. The calibration plate includes a first background region for calibrating the brightness of the scanning module and a second background region for intensifying an edge of a document to be scanned. The driving module is used for driving movement of the calibration plate. As a consequence, the scanning light beam from the scanning module is projected onto the first background region or the second background region of the calibration plate. Under this circumstance, the purposes of calibrating the brightness and increasing the image processing efficiency are both achieved. Moreover, since the calibration plate is driven by the driving module to be moved in the direction parallel with said scanning light beam, the purpose of dynamically adjusting the brightness can be achieved.

9 Claims, 10 Drawing Sheets

SCANNING APPARATUS

FIELD OF THE INVENTION

The present invention relates to a scanning apparatus, and more particularly to a scanning apparatus that has a calibration plate with two background regions and is capable of dynamically calibrating brightness.

BACKGROUND OF THE INVENTION

A scanning apparatus such as a sheet-feeding type scanning apparatus or a flatbed scanning apparatus is one of the widely-used office machines for scanning a paper document and converting the paper document into an electronic document. Generally, the conventional sheet-feeding type scanning apparatus comprises a feeding mechanism, a scanning module, and a calibration plate. The feeding mechanism is used for feeding a paper into a conveying channel. The scanning module is fixed at a downstream position of the feeding mechanism and located at a side of the conveying channel for capturing an image of the paper document. The calibration plate is located at another side of the conveying channel and faces the scanning module. The calibration plate provides a white background basis for calibrating the scanning module in order to avoid brightness distortion of the scanned imaged. Moreover, for allowing the paper to be smoothly transported across the scanning module, the calibration plate is fixed on the office machine to provide a function of pressing the paper. Consequently, the quality of the document image will not be impaired.

However, if the conventional sheet-feeding type scanning apparatus is used for scanning a small-sized document such as a name card, some problems may occur. For example, since the white background of the calibration plate uncovered by the document is still scanned as a portion of the scanned image, the size of the scanned image is increased. Under this circumstance, the capacity of the storage medium is wasted. For shortening the size of the scanned image, the conventional sheet-feeding type scanning apparatus or the computer which is in communication with the conventional sheet-feeding type scanning apparatus may utilize a conventional image processing program to allow the document image and the background image of the scanned image to be separated from each other. Consequently, only the document image of the scanned image is retained. However, since most of the widely-used documents are white and the calibration plate is also white, it is difficult to recognize the border between the document image and the background image of the scanned image. Under this circumstance, the task of removing the background image from the scanned image becomes more difficult.

Moreover, as previously described, the scanning module and the calibration plate of the conventional sheet-feeding type scanning apparatus fail to be moved relative each other. If some specks appear on the calibration plate, the scanning module can only acquire abnormal image data. Since the scanning module is unable to acquire more image data of the calibration plate by moving the scanning module or the calibration plate, the scanning module fails to recognize whether the image data are abnormal. Under this circumstance, the scanning module will perform a brightness calibration according to the abnormal image data. Consequently, the efficacy of the brightness calibration is usually unsatisfied.

Therefore, there is a need of providing an improved scanning module in order to overcome the above drawbacks.

SUMMARY OF THE INVENTION

The present invention provides a scanning apparatus capable of calibrating the brightness and easily removing the background image.

In accordance with an aspect of the present invention, there is provided a scanning apparatus. The scanning apparatus includes a scanning module, a calibration plate, and a driving module. The scanning module is used for generating a scanning light beam. The calibration plate faces the scanning module, and includes a first background region and a second background region. The driving module is used for driving the calibration plate, so that the scanning light beam from the scanning module is projected onto the first background region or the second background region of the calibration plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
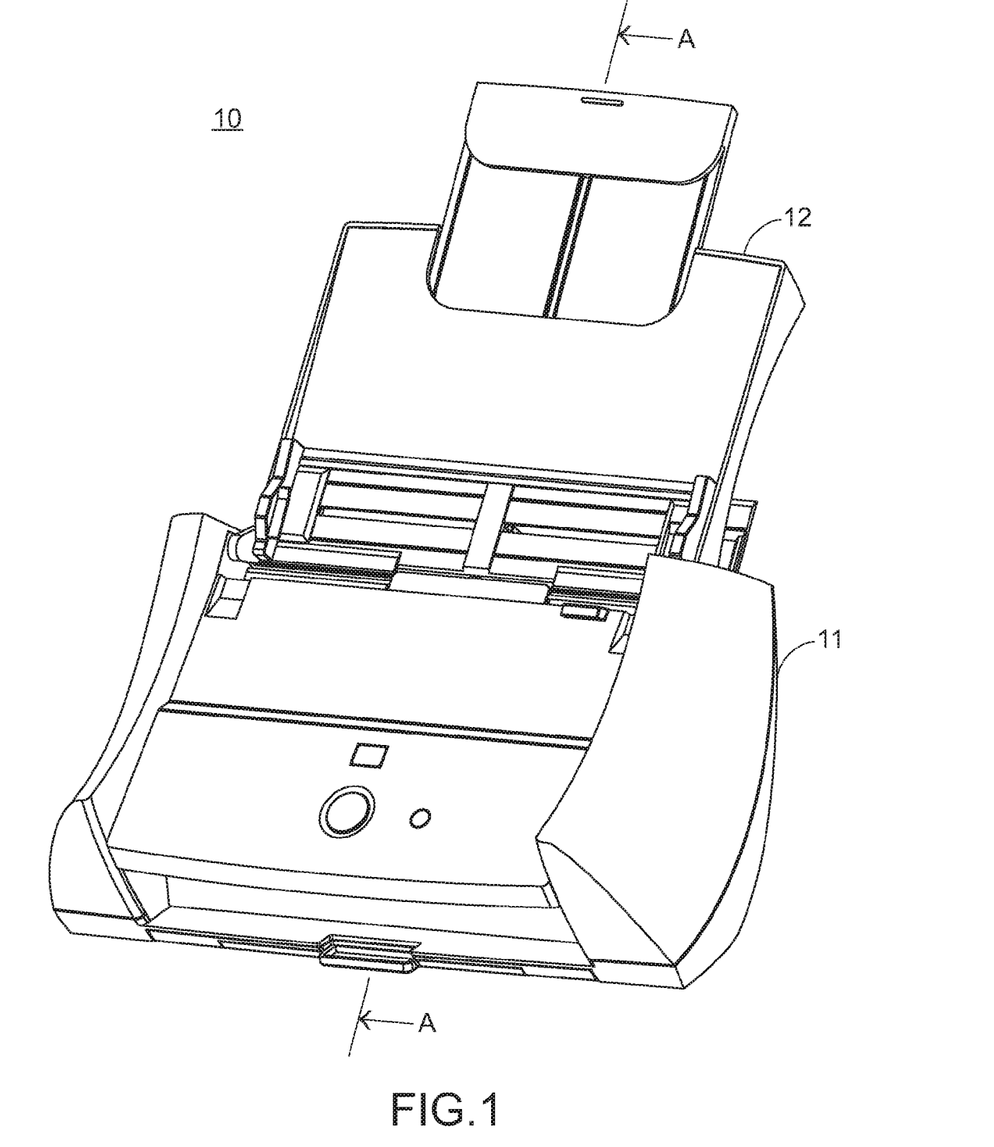
FIG. 1 is a schematic perspective view illustrating a scanning apparatus according to an embodiment of the present invention.
Figure 2:
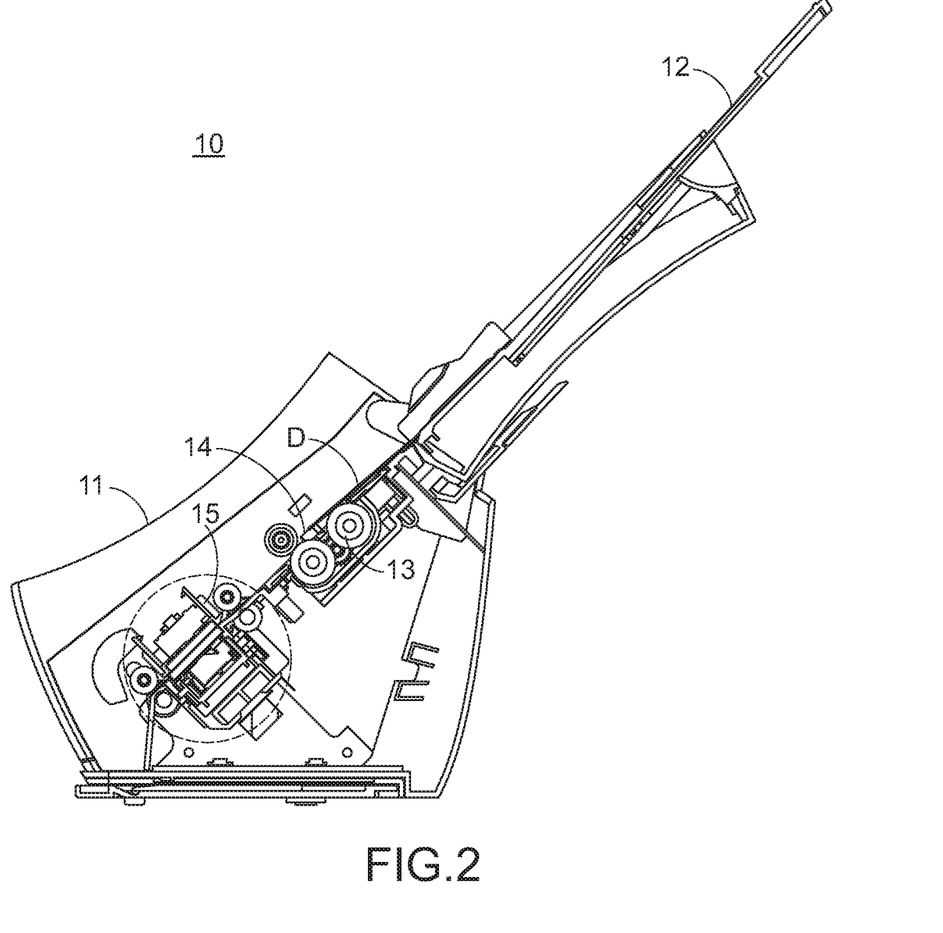
FIG. 2 is a cross-sectional view illustrating the scanning apparatus of FIG. 1 and taken along the line A-A.

FIG. 1 is a schematic perspective view illustrating a scanning apparatus according to an embodiment of the present invention. FIG. 2 is a cross-sectional view illustrating the scanning apparatus of FIG. 1 and taken along the line A-A. As shown in FIGS. 1 and 2, the scanning module 10 comprises a casing 11, an input tray 12, a feeding mechanism 13, a conveying channel 14, and a scanning module 15.

The input tray 12 is located at a side of the casing 11 for supporting a document D to be scanned. The feeding mechanism 13, the conveying channel 14 and the scanning module 15 are disposed within the casing 11 for conveying and scanning the document D. After the document D is fed into the conveying channel 14, the feeding mechanism 13 at bilateral sides of the conveying channel 14 will convey the document D to the downstream scanning module 15. The scanning module 15 is used for generating a scanning light beam and capturing an image of the document D. An example of the scanning module 15 includes but is not limited to a contact image sensor module (also referred as a CIS module).

Figure 3:
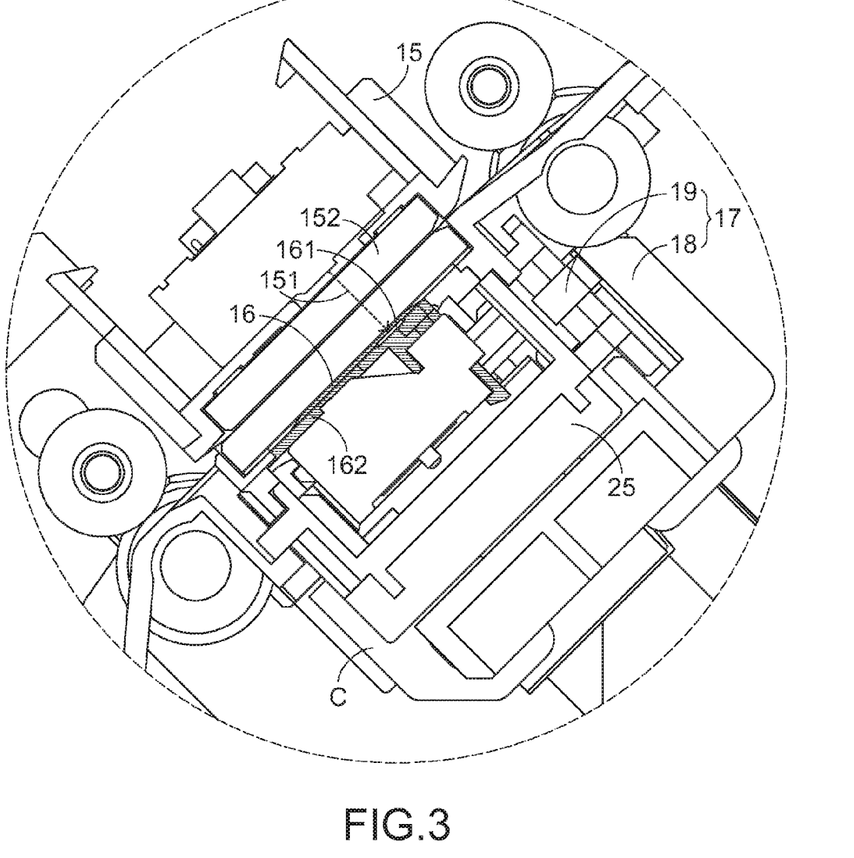
FIG. 3 is a schematic enlarged view illustrating a portion of the scanning apparatus of FIG. 2.

FIG. 3 is a schematic enlarged view illustrating a portion of the scanning apparatus of FIG. 2. As shown in FIG. 3, the scanning module 15 generates a scanning light beam 151. The scanning module 15 further comprises a scanning window 152. The scanning window 152 is a transparent plate to be contacted with the document D. After the scanning light beam 151 is generated by the scanning module 15, the scanning light beam 151 is projected onto a surface of the document D. After the scanning light beam 151 is transmitted through the scanning window 152, the scanning light beam 151 is reflected back to the scanning module 15. Then, the scanning light beam 151 is received by an optical sensing element (not shown) within the scanning module 15. Consequently, the pixel data of the image are generated, and the function of scanning the image is achieved.

Figure 4:
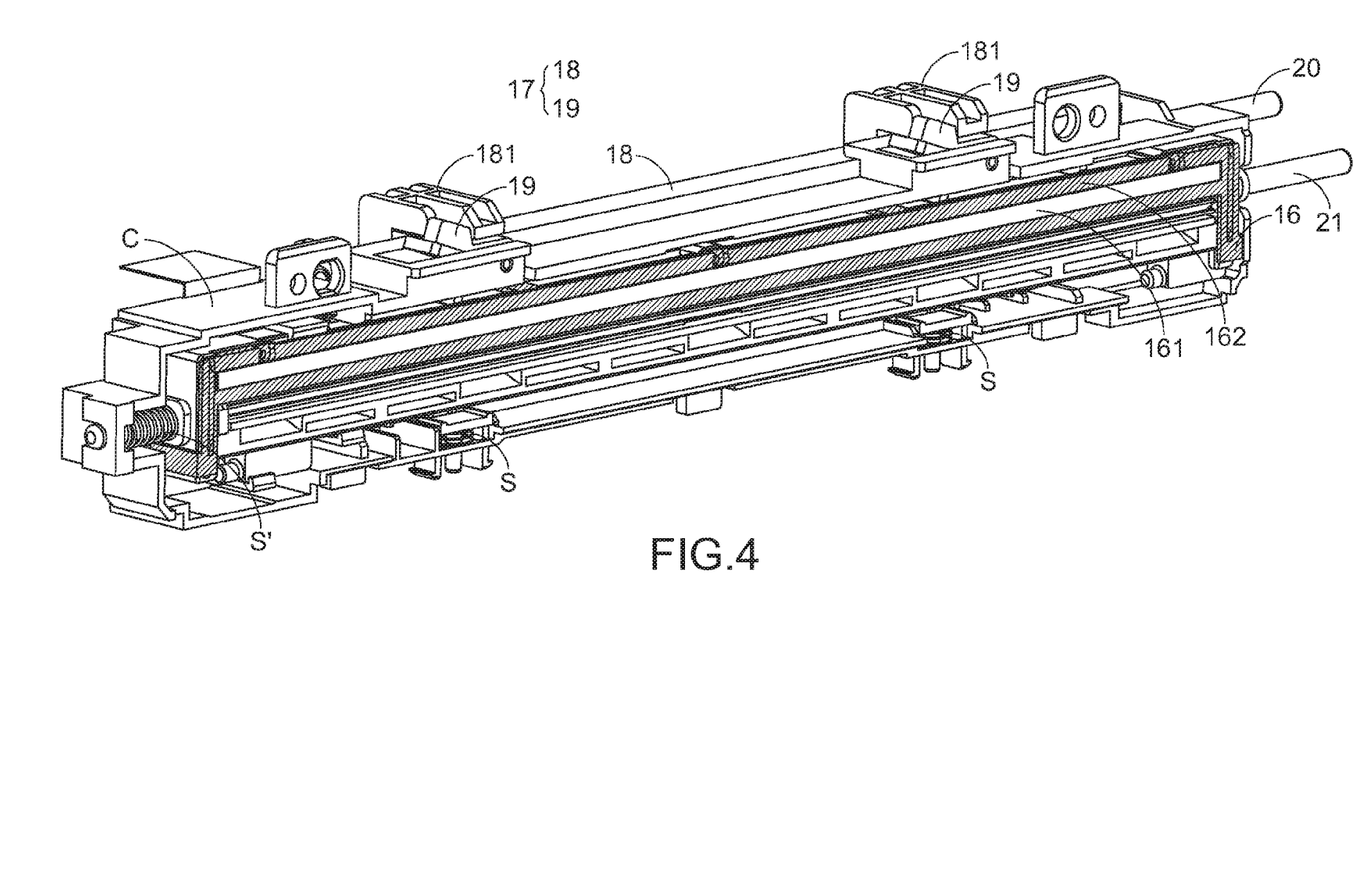
FIG. 4 is a schematic perspective view illustrating a calibration plate and a driving module of the scanning apparatus according to the embodiment of the present invention.

Next, please refer to FIG. 4. FIG. 4 is a schematic perspective view illustrating a calibration plate and a driving module of the scanning apparatus according to the embodiment of the present invention. As shown in FIGS. 3 and 4, the scanning module 10 further comprises a calibration plate 16 and a driving module 17. The calibration plate 16 is used for calibrating the brightness of the scanning module 15 and providing a background basis to scan the document D. The driving module 17 is used for driving movement of the calibration plate 16.

Moreover, both of the calibration plate 16 and the driving module 17 are located at an opposite side of the scanning module 15. The calibration plate 16 is fixed in a bracket C. Moreover, the calibration plate 16 faces the scanning module 15. The driving module 17 is located at a first side of the bracket C.

For achieving a brightness calibrating function of the calibration plate 16 and facilitating distinguishing the calibration plate 16 from the document D, the calibration plate 16 comprises a first background region 161 and a second background region 162. The first background region 161 is used for calibrating the brightness, and the second background region 162 is used for intensifying an edge of the document D.

In this embodiment, the first background region 161 has a white color for calibrating the brightness of the scanning module 15, and the second background region 162 has a black color for intensifying the edge of the document D. Under this circumstance, the scanning apparatus 10 or other apparatus with an image processing program (e.g. a computer) can easily recognize the edge of the document D in order to separate the document image and the background image of the scanned image from each other. It is noted that numerous modifications and alterations may be made while retaining the teachings of the invention. For example, the colors of the first background region 161 and the second background region 162 are not restricted to the white color and the black color, respectively. Moreover, the functions of the first background region 161 and the second background region 162 may be exchanged. Moreover, in an embodiment, the second background region 162 is a black bracket with a hollow portion, and the first background region 161 is white thin plate. The white thin plate is embedded into the hollow portion of the black frame, so that the white thin plate is fixed in the black frame. The structures or the arrangements of the first background region 161 and the second background region 162 are not restricted.

Figure 5:
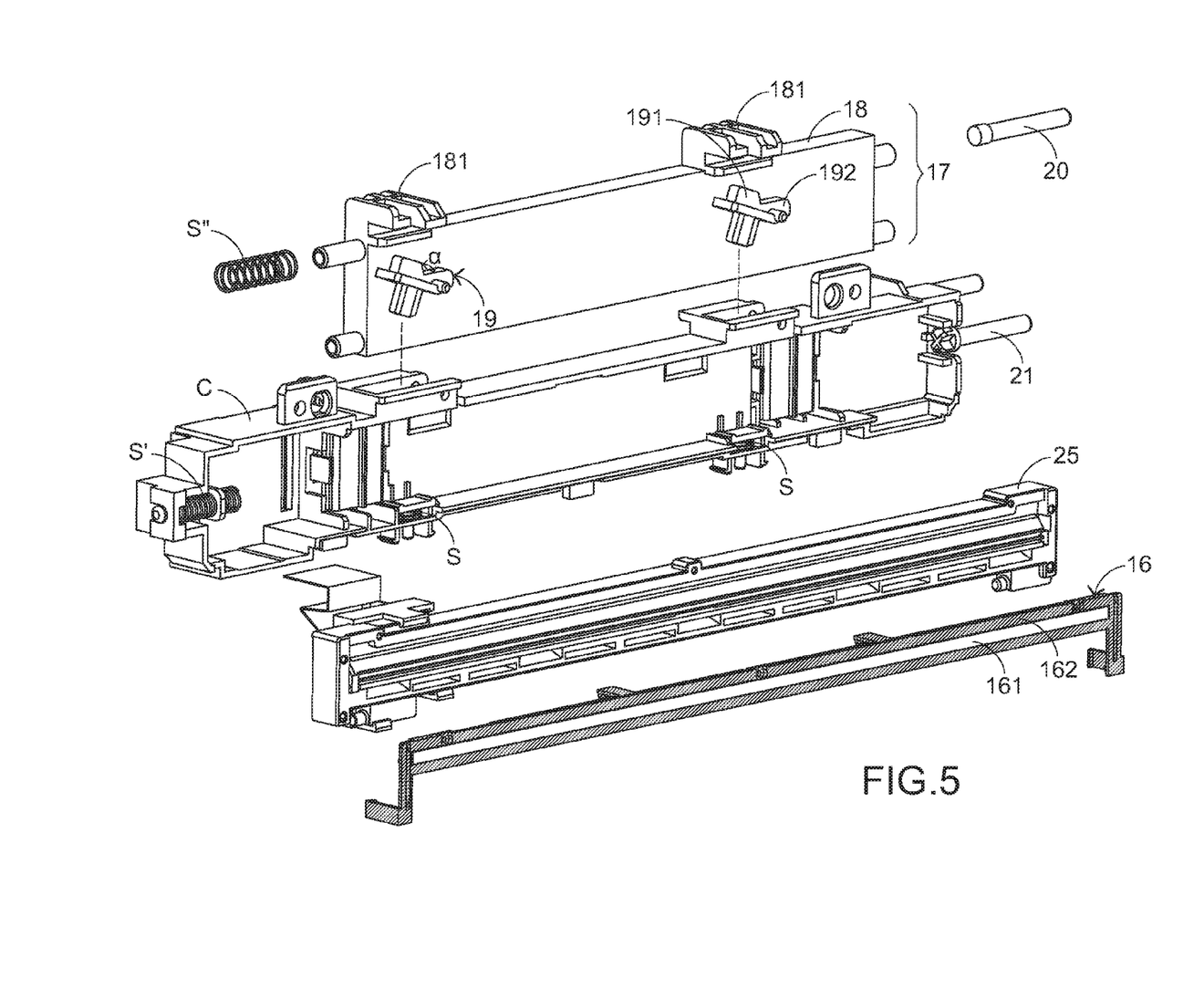
FIG. 5 is a schematic exploded view illustrating the calibration plate and the driving module of the scanning apparatus according to the embodiment of the present invention.

Hereinafter, the components of the driving module 17 and the relationship between the calibration plate 16 and the driving module 17 will be illustrated with reference to FIGS. 4 and 5. FIG. 5 is a schematic exploded view illustrating the calibration plate and the driving module of the scanning apparatus according to the embodiment of the present invention. As shown in FIGS. 4 and 5, the driving module 17 comprises a first linking mechanism 18, two second linking mechanisms 19, a first push rod 20, and a second push rod 21. The first push rod 20 is located at the first side of the bracket C for driving the first linking mechanism 18. The second push rod 21 is penetrated through the bracket C for driving the calibration plate 16. The first linking mechanism 18 comprises two protrusion blocks 181 for pushing the second linking mechanism 19. Each of the second linking mechanisms 19 comprises a first sustaining part 191 and a second sustaining part 192. The first sustaining part 191 and the second sustaining part 192 of each second linking mechanism 19 are used to be contacted with a corresponding protrusion block 181 of the first linking mechanism 18. Moreover, there is an included angle α between the first sustaining part 191 and the second sustaining part 192.

The calibration plate 16 is disposed within the bracket C. The second linking mechanisms 19 are penetrated through the first side of the bracket C to be connected with the first linking mechanism 18 and the calibration plate 16. In case that the first linking mechanism 18 is pushed by the first push rod 20 in response to an external force or the first push rod 20 is pushed by the first linking mechanism 18, the protrusion block 181 of the first linking mechanism 18 is moved to the first sustaining part 191 or the second sustaining part 192 of the corresponding second linking mechanism 19. Consequently, the second linking mechanism 19 is correspondingly rotated. Upon rotation of the second linking mechanism 19, the calibration plate 16 is correspondingly moved toward the first linking mechanism 18 or away from the first linking mechanism 18. Moreover, two elastic elements S and an elastic element S' are located at a second side of the bracket C. These elastic elements S and S' are sustained against the sidewall of the bracket C for driving the calibration plate 16 to be returned to its original position. Moreover, an elastic element S" is sustained against the bracket C and the first linking mechanism 18 for allowing the first linking mechanism 18 to be returned to its original position.

It is noted that the orientation of the elastic element S is perpendicular to the orientation of the elastic element S'. Consequently, these elastic elements S and S' are used as the position-returning mechanisms for allowing the calibration plate 16 to be returned to the original position in different directions. The first push rod 20, the second push rod 21 and the elastic elements S, S' and S" are used as means for driving the calibration plate 16 and the driving module 17 only. However, the components for driving the calibration plate 16 and the driving module 17 are not restricted to the above components.

Figure 6:
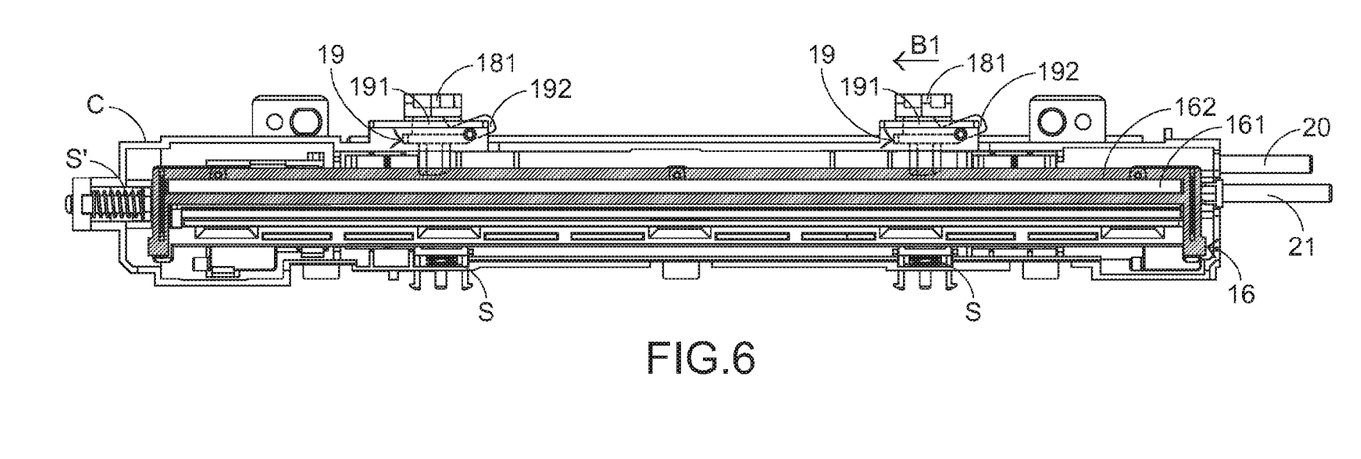
FIGS. 6 and 7 schematically illustrate the actions of the calibration plate and the driving module of the scanning apparatus according to the embodiment of the present invention.
Figure 7:
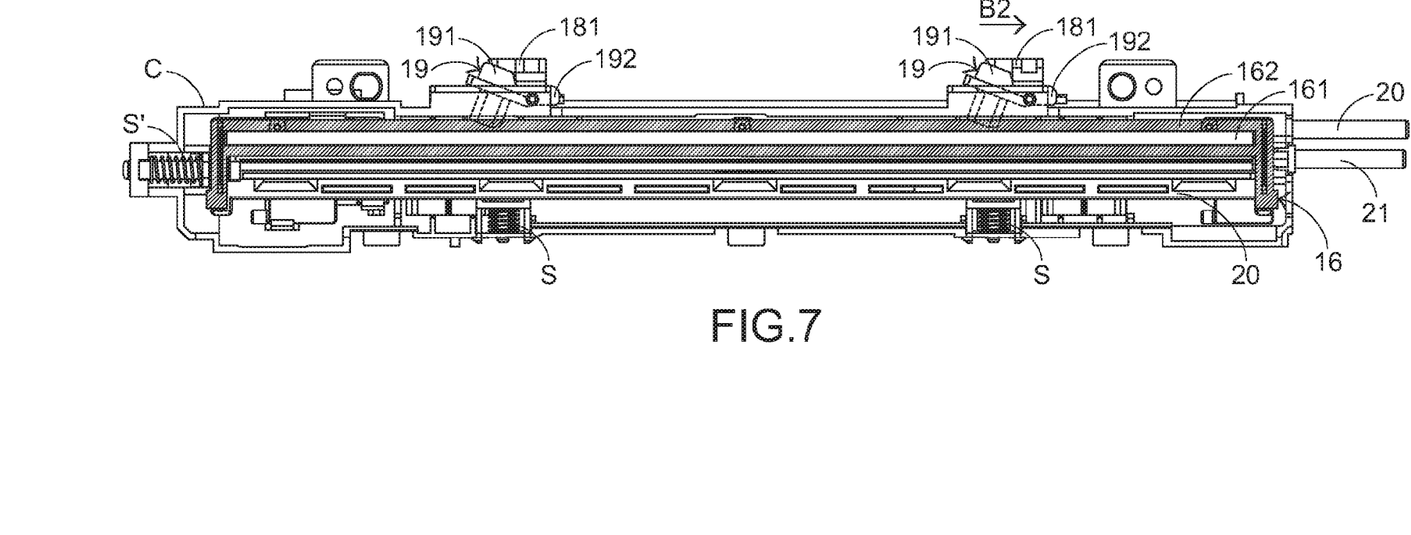

Hereinafter, the operations of the calibration plate 16 and the driving module 17 will be illustrated with reference to FIGS. 2, 6 and 7. FIGS. 6 and 7 schematically illustrate the actions of the calibration plate and the driving module of the scanning apparatus according to the embodiment of the present invention.

Before the scanning apparatus 10 starts to perform the scanning operation, the scanning module 15 may scan the first background region 161 of the calibration plate 16 in order to calibrate the brightness of the scanning module 15. As shown in FIG. 6, the first push rod 20 is moved in a first direction B1 in response to an external force. Consequently, the first linking mechanism 18 is driven to be moved in the first direction B1, and the elastic element S" (see FIG. 5) is subjected to deformation to accumulate elastic potential energy. Moreover, since the protrusion block 181 of the first linking mechanism 18 is sustained against the first sustaining part 191 of the corresponding second linking mechanism 19, the calibration plate 16 is moved away from the protrusion block 181 of the first linking mechanism 18. Under this circumstance, the elastic elements S are pushed by the calibration plate 16, and the elastic elements S are subjected to deformation to accumulate elastic potential energy.

Meanwhile, as shown in FIG. 3, the scanning light beam 151 from the scanning module 15 is projected onto the first background region 161 of the calibration plate 16 in order to calibrate the brightness of the scanning module 15. Please refer to FIG. 6 again. The calibration plate 16 is scanned by the scanning module 15. Moreover, in response to the external force, a supporting member 25 for supporting the calibration plate 16 is pushed by the second push rod 21. Consequently, the calibration plate 16 is driven to be moved in the first direction B1. As the calibration plate 16 is moved in the first direction B1, the scanning module 15 will generate more image pixel data of the calibration plate 16. Since the calibration plate 16 is moved back and forth in the direction perpendicular with said scanning light beam 151, the scanning module 15 will generate additional image pixel data. After the inaccurate image pixel data are removed from these image pixel data, the brightness calibration of the scanning module 15 is more precise. Moreover, as the calibration plate 16 is moved in the first direction B1, the elastic element S' is pushed by the calibration plate 16. Consequently, the elastic element S' is subjected to deformation to accumulate elastic potential energy.

After the calibrating operation of the scanning module 15 is completed, the scanning apparatus 10 starts to convey the document D to the scanning module 15, so that the document D can be scanned by the scanning module 15. As shown in FIG. 7, the external force exerted on the first push rod 20 is eliminated. Consequently, the elastic potential energy of the elastic element S" (see FIG. 5) is released, and the first linking mechanism 18 is driven to be moved in a second direction B2. At the same time, since the external forces exerted on the elastic elements S are eliminated, the elastic elements S are no longer subjected to deformation, and the elastic potential energy of the elastic elements S is released. Under this circumstance, the calibration plate 16 is pushed to be moved toward the protrusion blocks 181 of the first linking mechanism 18. As mentioned above, there is the included angle α between the first sustaining part 191 and the second sustaining part 192. As the first linking mechanism 18 is moved in the second direction B2 and the calibration plate 16 is moved toward the protrusion block 181 of the first linking mechanism 18, the second linking mechanism 19 is driven by the first linking mechanism 18 and the calibration plate 16 to be rotated in a clockwise direction. Under this circumstance, the protrusion block 181 of the first linking mechanism 18 is moved from the first sustaining part 191 of the second linking mechanism 19 to the second sustaining part 192 of the second linking mechanism 19.

Next, the external force exerted on the second push rod 21 is eliminated. Consequently, the elastic potential energy of the elastic element S' is released. Under this circumstance, the calibration plate 16 is driven to be moved in the second direction B2 until the calibration plate 16 is returned to a scanning position of the scanning module 15. After the document D is fed into the scanning apparatus 10 and transported across the scanning module 15, the scanning module 15 starts to scan the document and thus generates the pixel data of the image. The detailed actions of feeding and scanning the document D are similar to those of the conventional scanning apparatus, and are not redundantly described herein.

Figure 8:
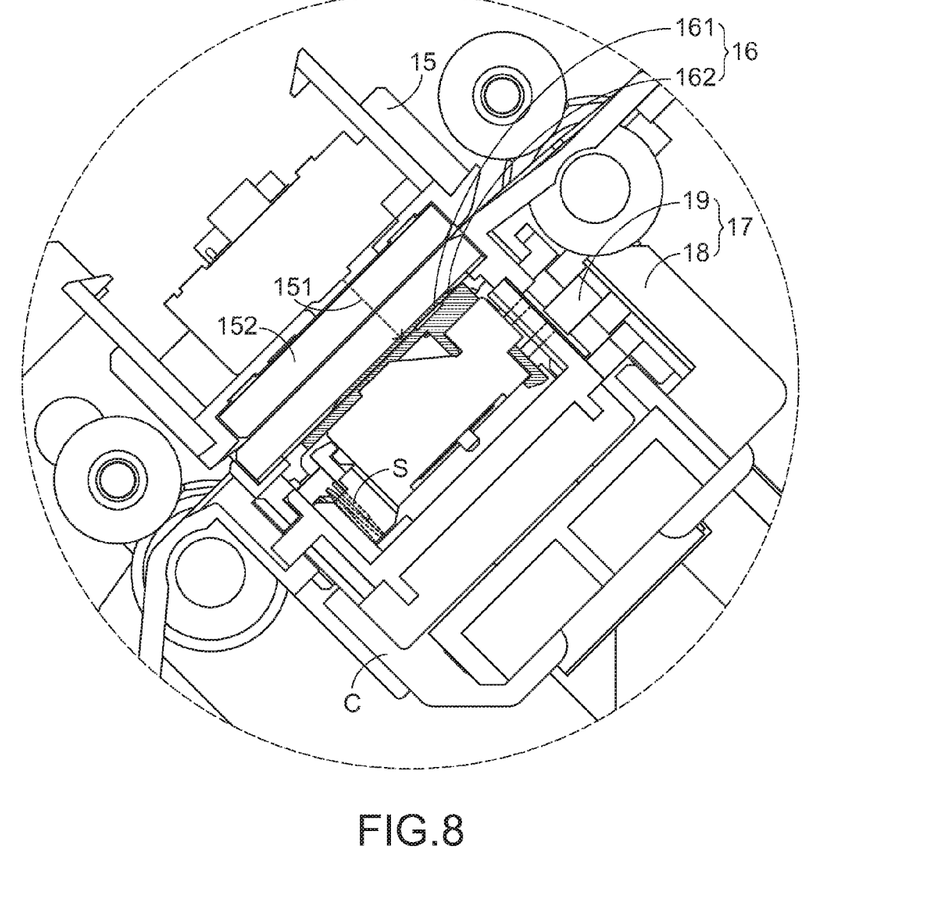
FIG. 8 is a schematic cross-sectional view illustrating the scanning module, the calibration plate and the driving module of the scanning apparatus according to the embodiment of the present invention during a scanning operation is performed.

FIG. 8 is a schematic cross-sectional view illustrating the scanning module, the calibration plate and the driving module of the scanning apparatus according to the embodiment of the present invention during a scanning operation is performed. As shown in FIG. 8, the scanning light beam 151 from the scanning module 15 is projected onto the second background region 162 of the calibration plate 16 in order to provide a scanning background for intensifying the edge of the document D.

In case that the brightness of the scanning module 15 needs to be calibrated again, the first push rod 20 is driven by the first push rod 20 to be moved in the first direction B1 again (see FIG. 6). Consequently, the protrusion block 181 of the first linking mechanism 18 is sustained against the first sustaining part 191 of the corresponding second linking mechanism 19. When the protrusion block 181 is moved to the first sustaining part 191 of the corresponding second linking mechanism 19, the calibration plate 16 is driven to be moved away from the protrusion block 181 of the first linking mechanism 18. Consequently, as shown in FIG. 3, the scanning light beam 151 from the scanning module 15 is projected onto the first background region 161 of the calibration plate 16 in order to calibrate the brightness of the scanning module 15.

Figure 9:
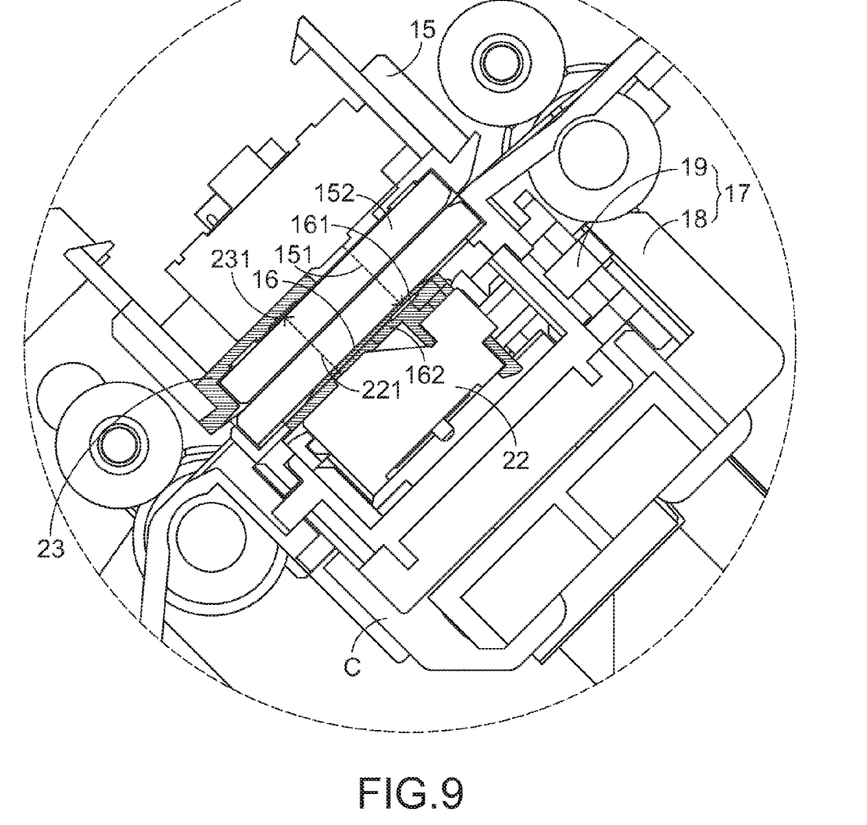
FIGS. 9 and 10 schematically illustrate the actions of the calibration plate and the driving module of the scanning apparatus according to another embodiment of the present invention.
Figure 10:
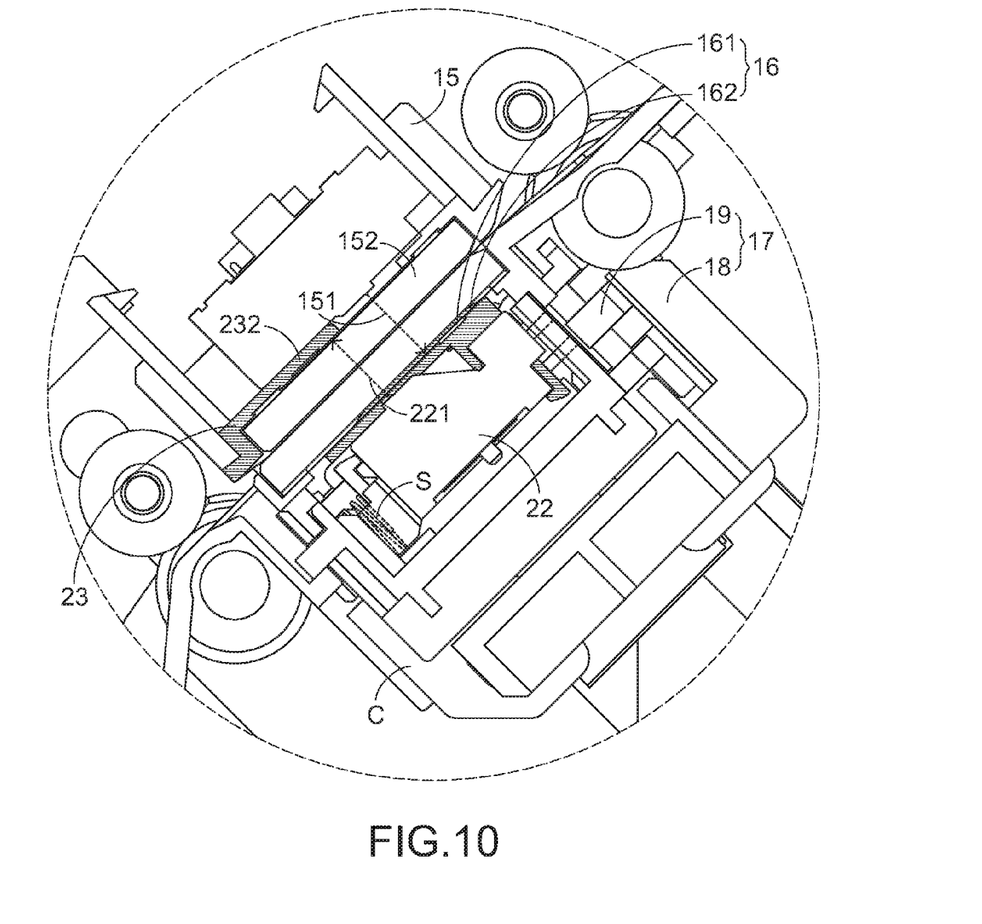

Hereinafter, a scanning apparatus according to another embodiment of the present invention will be illustrated with reference to FIGS. 9 and 10. FIGS. 9 and 10 schematically illustrate the actions of the calibration plate and the driving module of the scanning apparatus according to another embodiment of the present invention. In comparison with the above embodiment, the scanning apparatus of this embodiment further comprises a second scanning module 22 and a second calibration plate 23. The operations and the other components of the scanning apparatus of this embodiment are similar to those of the above embodiment, and are not redundantly described herein.

The second scanning module 22 is used for scanning a backside of the document D. The second calibration plate 23 is used for calibrating the brightness of the second scanning module 22 and providing a scanning background to intensify the edge of the document D. An example of the second scanning module 22 includes but is not limited to a contact image sensor module (also referred as a CIS module).

As shown in FIGS. 9 and 10, the second scanning module 22 faces the second calibration plate 23. Moreover, the second scanning module 22 is disposed within the bracket C and fixed at a side of the calibration plate 16. The second scanning module 22 is used for generating a second scanning light beam 221. The second calibration plate 23 is disposed in the scanning module 15, and faces the second scanning module 22. The second calibration plate 23 comprises a third background region 231 and a fourth background region 232. In this embodiment, the first background region 161 and the third background region 231 have white colors for calibrating the brightness of the scanning module 15 and the second scanning module 22, respectively. Moreover, the second background region 162 and the fourth background region 232 have black colors for intensifying the edge of the document D.

Please refer to FIG. 9. Before the scanning apparatus 10 starts to perform the scanning operation, the calibration plate 16 is driven to be moved away from the protrusion block 181 of the first linking mechanism 18. Consequently, the scanning light beam 151 from the scanning module 15 is projected onto the first background region 161 of the calibration plate 16.

The way of driving the calibration plate 16 is similar to that of the above embodiment, and is not redundantly described herein. Moreover, the second scanning module 22 is fixed on the calibration plate 16 and linked with the calibration plate 16. Consequently, as the calibration plate 16 is driven, the second scanning module 22 is correspondingly driven. Under this circumstance, the second scanning light beam 221 from the second scanning module 22 is projected onto the third background region 231 of the second calibration plate 23 in order to calibrate the brightness of the second calibration plate 23.

Next, please refer to FIG. 10. After the calibrating operation of the scanning module 15 is completed, the scanning apparatus 10 starts to convey the document D to the scanning module 15 and the second scanning module 22, so that the document D can be scanned by the scanning module 15 and the second scanning module 22. As the calibration plate 16 is driven, the second scanning module 22 is correspondingly moved with the calibration plate 16. Under this circumstance, the second scanning light beam 221 from the second scanning module 22 is projected onto the fourth background region 232 of the second calibration plate 23 in order to intensify the edge of the document D.

In other words, due to the linkage between the calibration plate 16 and the second scanning module 22, the brightness of the scanning module 15 and the second scanning module 22 can be calibrated simultaneously. Moreover, during the process of scanning the document D, the scanning light beam 151 from the scanning module 15 and the second scanning light beam 221 from the second scanning module 22 are respectively projected onto the second background region 162 and the fourth background region 232 having black colors in order to intensify the edge of the document D.

From the above descriptions, the present invention provides a scanning apparatus. The scanning apparatus comprises a scanning module, a calibration plate, and a driving module. The calibration plate comprises a first background region for calibrating the brightness of the scanning module and a second background region for intensifying an edge of a document to be scanned. The driving module is used for driving movement of the calibration plate. As a consequence, the scanning light beam from the scanning module is projected onto the first background region or the second background region of the calibration plate. In other words, the calibration plate of the scanning apparatus of the present invention not only has the function of calibrating the brightness of the scanning module but also has the function of intensifying the edge of the document during the scanning operation is performed. Under this circumstance, the difficulty of separating the document image and the background image of the scanned image will be minimized, and the image processing efficiency will be enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning apparatus, comprising:
   a scanning module for generating a scanning light beam;
   a calibration plate facing said scanning module, and comprising a first background region and a second background region; and
   a driving module for driving said calibration plate, so that said scanning light beam from said scanning module is projected onto said first background region or said second background region of said calibration plate, wherein said driving module is located at a side of said calibration plate, and said driving module comprises:
   a first linking mechanism comprising a protrusion block; and
   a second linking mechanism connected with said first linking mechanism and said calibration plate, wherein as said first linking mechanism is moved, said second linking mechanism is driven by said protrusion block of said first linking mechanism, and said calibration plate is correspondingly moved with said second linking mechanism.

2. The scanning apparatus according to claim 1, wherein said first background region has a white color, and said second background region has a black color.

3. The scanning apparatus according to claim 1, wherein a brightness of said scanning module is calibrated by said first background region, and an edge of the document is intensified by said second background region.

4. The scanning apparatus according to claim 1, wherein said scanning module is a contact image sensor module (CIS module).

5. The scanning apparatus according to claim 1, wherein said second linking mechanism comprises a first sustaining part and a second sustaining part to be contacted with said first linking mechanism, wherein there is an included angle between said first sustaining part and said second sustaining part, wherein as said first linking mechanism is moved and said protrusion block is contacted with said first sustaining part or said second sustaining part of said second linking mechanism, said second linking mechanism is correspondingly rotated, so that said calibration plate is moved toward said first linking mechanism or away from said first linking mechanism.

6. The scanning apparatus according to claim 1, wherein said driving module further comprises an elastic element for returning said calibration plate to an original position.

7. The scanning apparatus according to claim 1, further comprises:
   a casing;
   an input tray; and
   a feeding mechanism for conveying a document to be scanned.

8. The scanning apparatus according to claim 1, further comprises an additional scanning module, which is connected with said calibration plate for scanning a backside of a document.

9. The scanning apparatus according to claim 1, wherein when said scanning module scans said first background region of said calibration plate to calibrate brightness, said calibration plate is driven by said driving module to be moved back and forth in a direction perpendicular with said scanning light beam.

* * * * *